3,396,117
ENCAPSULATION TECHNIQUE
Clarke E. Schuetze, San Antonio, Tex., assignor, by mesne assignments, to AMP Incorporated, Harrisburg, Pa., a corporation of New Jersey
No Drawing. Filed Sept. 7, 1965, Ser. No. 485,557
9 Claims. (Cl. 252—182)

ABSTRACT OF THE DISCLOSURE

A water-insoluble alginate salt capsule filled with an aliphatic amine curing agent for epoxy resins, said amine being admixed with a mono- or di-alkyl phenol to render it less fugitive.

---

This invention relates to improved methods for encapsulating certain reactive materials, and to capsules containing such materials. In particular, the invention relates to improved methods for encapsulating reactive substances useful for curing or hardening epoxy resins, and to capsules containing such substances.

The encapsulation of filler materials, either liquid or solid, in a continuous surrounding film of an encapsulating medium is disclosed, for example, in U.S. Patent No. 3,015,128 to Somerville. According to the technique there disclosed, the material to be encapsulated is centrifugally projected through a thin film of the encapsulating material. The capsules formed by passage of the filler material through a film of encapsulating medium are then suitably hardened by contact with a substance reacting with the film-forming encapsulating medium to form a continuous impermeable envelope around the filler.

Other techniques for encapsulation are disclosed in patents such as U.S. 2,766,478 to Raley and U.S. 2,275,154 to Merrill, for example. In the apparatus and techniques discussed in the last-mentioned patent, gravitational forces are relied upon to cause the formation of a capsule by passage of a filler through a thin film of the encapsulating medium.

These encapsulation methods are particularly amenable to the use, as film forming materials, of aqueous suspensions of water-soluble alginate salts, such as sodium, potassium, and ammonium alginates. These salts form viscous colloidal solutions in water, and react with calcium ion to form insoluble calcium alginate. By contacting capsules having a film of soluble alginate as the shell wall with a bath containing dissolved calcium ions, a hardened calcium alginate shell wall is formed.

Other water-soluble film-forming materials may be combined with a soluble alginate to modify the properties of the resulting shell wall. For example, polyvinyl alcohol and gelatin have been used in combination with soluble alginates as encapsulating media. In certain cases, these materials may be used alone as the component of the shell wall.

It has been suggested in the art, for example in British Patent No. 765,082, that one or both components of epoxy resin systems comprising a fluid epoxy resin and a hardener or curing agent therefor be encapsulated. The prior art suggests that such encapsulated systems would be stable until rupture of the capsules permitted chemical interaction of the resin and hardener.

In practice, however, the encapsulation of such systems is difficult. The hardeners or curing agents, particularly, are highly reactive and fugitive substances which are difficult to encapsulate. Thus, in attempting to encapsulate amine curing agents numerous problems are encountered. Many of the amines have visco-elastic properties rendering them intractable to encapsulation. Such materials are highly hydrogen bonded and may tend to string or otherwise be unsuitable for forming discrete capsules. Also, certain amine hardeners tend to emulsify with the aqueous solutions generally employed for the encapsulating medium when in long contact with such solutions. Further, the amines tend to permeate the shell wall of the capsules, leading to the production of capsules with low fill and poor shelf life.

According to present invention, these difficulties are overcome by combining the amines to be encapsulated with one or more water-insoluble alkyl-substituted phenols having one or more alkyl side chains, each having from 6 to 12 carbon atoms, preferably from 7 to 10 carbon atoms. Nonyl phenol used in combination with amine curing agents for epoxy systems has proved particularly advantageous.

The presence of an alkyl phenol improves the flow properties of otherwise pituitous materials, discourages emulsification of the amines, lengthens the shelf life of capsules containing such amines, and increases the percent of fill of the capsules. The percent of fill refers to the weight of the capsules' contents compared with the total weight of the capsules.

According to the present invention, an alkyl phenol such as hexyl phenol, dodecyl phenol, nonyl phenol, octyl phenol, di-nonyl phenol, di-octyl phenol etc. is combined with an amine hardener such that the mixture contains from about 30 percent to about 80 percent of phenol by weight, preferably about 55–65 percent. The relative amounts of phenol and amine can be varied widely depending on the activity of the amine for hardening epoxy resins and on the tendency for amine to be lost during the encapsulation process. In general, the more phenol employed, the easier is the encapsulation.

The resulting mixture, which has reduced water sensitivity and improved viscosity, is then encapsulated by known techniques, as discussed above. The presence of the alkyl phenol in the system is not detrimental. Indeed, phenols have been incorporated into epoxy resins systems in the past to improve the properties of the cured resin. Thus, the presence of the alkyl phenols does not appreciably slow the rate of reaction between the amine hardening agent and the epoxy. However, the phenol content of the amine-containing hardener capsules must be kept in mind when choosing the quantity of hardener capsules to be employed in admixture with an epoxy material to be hardened, so that the requisite number of equivalents of active hydrogen atoms from the amine is supplied to the epoxy resin.

The amines used for the curing of epoxy resins are well known to the art, and are discussed in detail, for example, in chapters 3 and 4, incorporated herein by reference, of "Epoxy Resins, Their Applications and Technology," by Lee and Neville, McGraw-Hill Book Company, Inc., New York (1957). As discussed in these chapters, a variety of aliphatic amines having primary amino groups are employed as hardeners. The aliphatic amines may be combined in a variety of proportions to produce amine blends. Similarly, cyclic aliphatic amines, tertiary amines, tertiary amine salts, and aromatic amines can be employed for hardening epoxy resins.

The amines can be altered by reaction with ethylene oxide, by cyanoethylation, or by reaction with materials containing glycidyl groups. According to the present invention, such reaction products, or adducts, are preferably formed just prior to encapsulation, and are encapsulated before the adducts develop high viscosities which make them difficult to encapsulate. Good results are obtained by combining an amine and alkyl phenol mixture with a glycidyl ether such as an epichlorohydrin-Bisphenol-A resin.

Particularly good results have been obtained in the present invention when alkyl phenols are combined with one or more polyalkylene polyamines of the formula

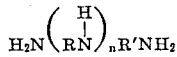

where $n$ is an integer from 1 to 3 and R and R′ are each lower alkylene, with an N-aminoalkyl piperazine such as N-aminoethyl piperazine, or with mixtures of such polyamines and piperazines. Examples of polyalkylene polyamines are diethylenetriamine, triethylenetetramine, and tetraethylene pentamine.

The encapsulated amine-phenol mixtures can be employed to harden conventional epoxy resins, particularly those of the epichlorohydrin-Bisphenol-A type. The hardener capsules can be dispersed in a liquid epoxy resin, and crushed when hardening of the system is desired, or may be admixed with other capsules containing the epoxy resin, in which case the system is hardened by crushing the mixed capsules.

For both the hardener and the epoxy capsules, shell wall materials comprising soluble alginates alone or in combination with polyvinyl alcohol, polyethylene oxide polymers, acrylic polymers and/or gelatin, have proved particularly suitable. In the aqueous suspensions of the materials which are prepared for the purpose of encapsulation, the content of alginate and other solids present is preferably between about 5 to 10 percent by weight. Since hardening of the capsule shell wall is primarily effected by conversion of water-soluble alginates to insoluble substances, at least about 40 to 50 percent by weight of the solids present in the aqueous suspension are preferably alginate materials. If the percentage of non-alginate solids exceeds more than about 60 percent by weight of the total solids content of the suspension, difficulty may be had in drying the resulting capsule materials by conventional techniques. However, where excess moisture can be removed by the use of solid dessicants or the like, smaller quantities of alginate in the shell wall-forming solution may be employed. When gelatin is present in the shell wall solutions, it is preferably present in amounts less than about 1 percent by weight of the solution. Larger amounts of gelatin tend to cause stringing of the shell wall solution, rendering it less adaptable to use in the encapsulation processes described.

Although the nature and properties of the shell wall-forming solution may vary depending on the size of the capsule to be produced, the material to be encapsulated, and specific techniques at capsule formation, the solutions employed in forming the capsule shell wall generally have a viscosity at 25° C. between about 2 stokes and about 35 stokes. However, operation is usually in a narrower range between about 2 and about 10 stokes, and the best results are usually obtained when the viscosity of the solution is between about 3 and about 7 stokes.

The production of capsules of a size between about 250 microns and 1500 microns is of greatest interest from the point of view of practical applications, but still larger or smaller particles, up to 2500 microns or as small as 100 microns, for example, can be made by appropriate variation of the encapsulating techniques as described in the prior art.

The shell wall solutions described above may contain optional preservative agents for organic materials, such as the alginates, which may be subject to bacterial degradation. Such preservative materials are well known in the art, and include materials such as sodium benzoate, formaldehyde, the alkyl esters of p-hydroxy benzoic acid, mercurials, and the like. These preservatives may be present in amounts of up to 0.1 percent or 0.2 percent by weight of the solution.

Additionally, optional surfactant materials may be present in the shell wall-forming solution to modify its viscosity or flow properties. Non-ionic and anionic surface active agents have been added in amounts of about 3 ml. per 1000 grams of suspension, for example.

A particularly suitable mixture for the formation of shell walls is a solution or suspension comprising 5 percent by weight of sodium alginate ("XRA–10"), 3 percent by weight of polyvinyl alcohol ("Elvinol 70–05"), and from 0.5–1 percent by weight of gelatin (150 or 300 bloom). Although the grade of gelatin specified above is of a particular viscosity, materials giving more viscous solutions on dispersion in water can be employed in smaller quantities. To maintain the desirable solids content of the resulting dispersion, the amount of polyvinyl alcohol or alginate is then raised correspondingly. The polyvinyl alcohol indicated above is one which is substantially completely hydrolyzed. A high degree of hydrolysis in the polyvinyl alcohol is preferred, since hydrolyzed materials are less soluble in the organic substances used as fill in the capsules.

Other typical shell wall formulations are given below (all percentages are by weight):

| (A) | Percent |
|---|---|
| Soluble alginate | 2.75 |
| Polyvinyl alcohol | 2.00 |
| Gelatin | 1.00 |
| Water | 94.25 |
| (B) | |
| Soluble alginate | 5.50 |
| Gelatin | 0.55 |
| Water | 93.95 |
| (C) | |
| Soluble alginate | 5.24 |
| Polyethylene oxide ("Polyox WSR35") | 0.42 |
| Water | 94.34 |
| (D) | |
| Soluble alginate | 5.24 |
| Acrylic polymer ("Cyanamer P–26") | 0.42 |
| Water | 94.34 |

All of the compositions may be modified by the addition of minor amounts of surface active agents and/or preservatives.

Prior art techniques for producing multi-walled capsules can also be adapted to the present invention. U.S. Patent No. 2,379,817 to Mabbs, for example, teaches methods and apparatus for making multi-walled capsules by extrusion techniques using devices with a plurality of concentric orifices. Suitably, the outer shell comprises a hardenable alginate composition, while the inner shell comprises a material highly resistant to permeation by the encapsulated fill.

A better understanding of the present invention and of its many advantages will be had by referring to the following specific examples given by way of illustration.

Example 1

A mixture of diethylene triamine and nonyl phenol in equal parts by weight was encapsulated by extrusion techniques employing a solution comprising 3 percent by weight of sodium alginate, 2 percent of polyvinyl alcohol, 1 percent of gelatin, 94.0 percent of distilled water, and small amounts of a surfactant and preservative to form the shell wall. The capsules were projected into a hardening bath of aqueous calcium chloride solution.

The capsules were removed from the hardening bath and dried without difficulty. Capsule fill was 46.2 percent of the capsule weight, as determined by extraction. The fill comprised 36.4 percent of amine. The capsules remained spherical on storage, were free-flowing, and exhibited no significant loss of their contents.

An attempt to encapsulate diethylene triamine alone under similar conditions led to the formation of irregular, non-spherical capsules. Evidence of emulsification, or mixing of the shell and fill at the interface, was noted. When the capsules were removed from the hardening bath and dried, no amine was retained within the shell after drying.

Example 2

A 50–50 mixture by weight of nonyl phenol and triethylene tetramine was encapsulated under the conditions of Example 1. Spherical capsules were formed, without evidence of emulsification. On drying, the capsules were free-flowing and comprised a fill of 48.5 percent by weight. 42.0 percent of the fill material was amine. Loss of amine from these capsules was extremely slow.

Attempts to encapsulate triethylene tetramine under similar conditions but without an alkyl phenol present resulted in the formation of non-spherical capsules and severe diffusion of the amine through the shell into the hardening bath during the hardening step. As in Example 1, in the absence of an alkyl phenol, no amine was retained within the shell after drying.

Similar results were observed in the encapsulation of tetraethylene pentamine alone and in the presence of an alkyl phenol.

Example 3

A mixture comprising 48.3 parts of N-aminoethyl piperazine and 51.7 parts by weight of an alkyl phenol was encapsulated under the conditions of Example 1. The resulting spherical capsules had a fill of 43.1 percent of the capsule weight, of which 47.1 percent was amine.

Attempts to encapsulate the amine alone, in the absence of an alkyl phenol, were unsuccessful since no amine was retained within the capsule shell after recovery and drying of the capsules.

Example 4

A mixture comprising 2 parts by weight of diethylene triamine, 1 part of N-aminoethyl piperazine, and 3 parts of nonyl phenol was encapsulated using a shell wall encapsulating medium comprising 4.5 percent by weight of sodium alginate, 2.0 percent of polyvinyl alcohol, and 1.0 percent of 150 bloom gelatin with small amounts of a preservative and surfactant. The capsules, which were between 500 and 595 microns in size, had a fill of 50 percent (as determined by extraction), of which 33.1 percent was amine.

Example 5

Equal parts by weight of N-aminoethyl piperazine and of dinonyl phenol were encapsulated with an alginate—polyvinyl alcohol—gelatin shell. The capsules had a fill of 51.1 percent, of which 46.4 percent was amine.

Example 6

Four parts by weight of N-aminoethyl piperazine and six parts by weight of octyl phenol were admixed and encapsulated using an aqueous solution of 2.75 percent by weight of sodium alginate, 2.0 percent of polyvinyl alcohol, and 1 percent of 150 bloom gelatin. The capsules contained 57.4 percent of the fill mixture, of which 33 percent by weight was amine.

Example 7

A mixture of 45 parts by weight of N-aminoethyl piperazine and 55 parts of nonyl phenol was encapsulated using a shell wall solution of 5.5 percent by weight of sodium alginate and 1.0 percent of 150 bloom gelatin in water to give 100 parts. The resulting capsules had a fill of 46.4 percent, of which 40.4 percent was amine.

Example 8

An encapsulatable amine adduct was prepared by admixing 7.5 parts by weight of a mixture of substantially equal parts by weight of N-aminoethyl piperazine and nonyl phenol with 1 part by weight of a commercial epichlorohydrin/bisphenol A resin ("Epon 815"). The mixture was immediately encapsulated using a shell wall-forming solution of sodium alginate and a polyethylene oxide polymer ("Polyox WSR–N80") in water. The capsules were hardened in an aqueous calcium lactate bath, and then dried. The fill was 64.7 percent.

Example 9

7.5 parts by weight of a mixture of equal amounts of N-aminoethyl piperazine and of nonyl phenol were admixed with one part of the same "Epon 815" glycidyl resin as in Example 7 and one part of di-n-butyl phthalate as a plasticizer. The mixture was encapsulated using the same shell material as in Example 7. The fill was 55.5 percent, as determined by extraction.

Example 10

Doubled-walled capsules were prepared in which the fill comprised 45 parts of N-aminoethyl piperazine and 55 parts by weight of nonyl phenol. The solution used to form the inner shell wall was a 15 percent aqueous solution of polyvinyl alcohol. The outer shell wall-forming solution comprised 3.0 percent by weight of sodium alginate, 2.0 percent by weight of polyvinyl alcohol, and 1.0 percent of gelatin in water to make 100 percent. The capsules were immersed in a calcium chloride solution for hardening, and then dried.

The finished capsules, mostly 1000 to 1490 microns in size, had a fill of 37 percent, of which 40.6 percent was amine.

Capsules of the same size were also prepared using a 4.85 percent aqueous solution of carboxymethyl cellulose as the material forming the inner capsule shell. The fill was 45.9 percent, of which 38.7 percent was amine.

Example 11

The same amine-phenol mixture as in Example 10 was encapsulated in a double-walled shell in which the inner wall was pure 150 bloom gelatin and the outer wall was pure sodium alignate hardened by contact with calcium ion (calcium chloride) bath. The dry capsule fill by extraction was 49.4 percent, of which 42.6 percent was amine.

What is claimed is:

1. A capsule consisting essentially of (A) at least one amine curing agent selected from the group consisting of an N-aminoalkyl piperazine and a polyalkylene polyamine of the formula

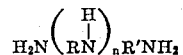

where $n$ is an integer from 1 to 3 and R and R' are each lower alkylene, in admixture with from about 30 percent to about 80 percent, by weight of said mixture, of an alkyl phenol having up to two alkyl side chains each having from 6 to 12 carbon atoms and (B) a continuous surrounding shell wall envelope consisting essentially of a water-insoluble alginate salt.

2. A capsule as in claim 1 wherein said amine is diethylene triamine.

3. A capsule as in claim 1 wherein said amine is triethylene tetramine.

4. A capulse as in claim 1 wherein said amine is tetraethylene pentamine.

5. A capsule as in claim 1 wherein said amine is N-aminoethyl piperazine.

6. A capsule as in claim 1 wherein said amine is a mixture of diethylene triamine and N-aminoethyl piperazine.

7. A capsule as in claim 1 wherein said alkyl phenol is octyl phenol.

8. A capsule as in claim 1 wherein said alkyl phenol is nonyl phenol.

9. A capsule as in claim 1 wherein said alkyl phenol is di-nonyl phenol.

References Cited

UNITED STATES PATENTS 2,800,458   7/1957   Green _____ 252—316

LEON D. ROSDOL, *Primary Examiner.*

S. D. SCHWARTZ, *Assistant Examiner.*